(12) United States Patent
Nagai

(10) Patent No.: US 9,124,732 B2
(45) Date of Patent: Sep. 1, 2015

(54) IMAGE PROCESSING APPARATUS, IMAGE PROCESSING METHOD, AND PROGRAM FOR THE SAME

(71) Applicant: CANON KABUSHIKI KAISHA, Tokyo (JP)

(72) Inventor: Jun Nagai, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 70 days.

(21) Appl. No.: 13/656,422

(22) Filed: Oct. 19, 2012

(65) Prior Publication Data

US 2013/0100469 A1    Apr. 25, 2013

(30) Foreign Application Priority Data

Oct. 25, 2011    (JP) ................. 2011-234198

(51) Int. Cl.
    G06K 15/02    (2006.01)
    H04N 1/00     (2006.01)
    H04N 1/32     (2006.01)
    H04N 1/60     (2006.01)

(52) U.S. Cl.
    CPC ....... H04N 1/00204 (2013.01); H04N 1/32128 (2013.01); H04N 1/6075 (2013.01); *H04N 1/00307* (2013.01); *H04N 2201/001* (2013.01); *H04N 2201/0081* (2013.01); *H04N 2201/0082* (2013.01); *H04N 2201/0091* (2013.01); *H04N 2201/3221* (2013.01); *H04N 2201/3222* (2013.01); *H04N 2201/3278* (2013.01)

(58) Field of Classification Search
    None
    See application file for complete search history.

(56) References Cited

U.S. PATENT DOCUMENTS

| 5,436,733 | A * | 7/1995 | Terada et al. ................. 358/448 |
| 2004/0095600 | A1 * | 5/2004 | Nitta et al. .................... 358/1.15 |
| 2004/0150732 | A1 * | 8/2004 | Yamanaka .................... 348/272 |
| 2005/0146621 | A1 * | 7/2005 | Tanaka et al. ............. 348/211.2 |
| 2006/0125927 | A1 * | 6/2006 | Watanabe ................. 348/211.1 |
| 2006/0238827 | A1 * | 10/2006 | Ikeda et al. .................... 358/448 |
| 2007/0255456 | A1 * | 11/2007 | Funayama ................... 700/266 |
| 2010/0134694 | A1 * | 6/2010 | Sakurai et al. ................ 348/708 |
| 2012/0269437 | A1 * | 10/2012 | He et al. ........................ 382/180 |
| 2013/0258387 | A1 * | 10/2013 | Hashimoto ................. 358/1.14 |
| 2013/0332706 | A1 * | 12/2013 | Tanaka .......................... 712/220 |

FOREIGN PATENT DOCUMENTS

JP          10-276323 A    10/1998

* cited by examiner

*Primary Examiner* — Kimberly A Williams
(74) *Attorney, Agent, or Firm* — Canon U.S.A., Inc. IP Division

(57) ABSTRACT

When an image processing apparatus transmits image data input thereto to an external apparatus via a network, and image processing is performed on the image data in the external apparatus, the image processing apparatus selects and transmits a component signal of the image data required according to the type of the image processing to be applied. The image processing apparatus receives the component signal processed with the image processing in the external apparatus, and synthesizes the received signals with the component signal stored in the apparatus.

9 Claims, 10 Drawing Sheets

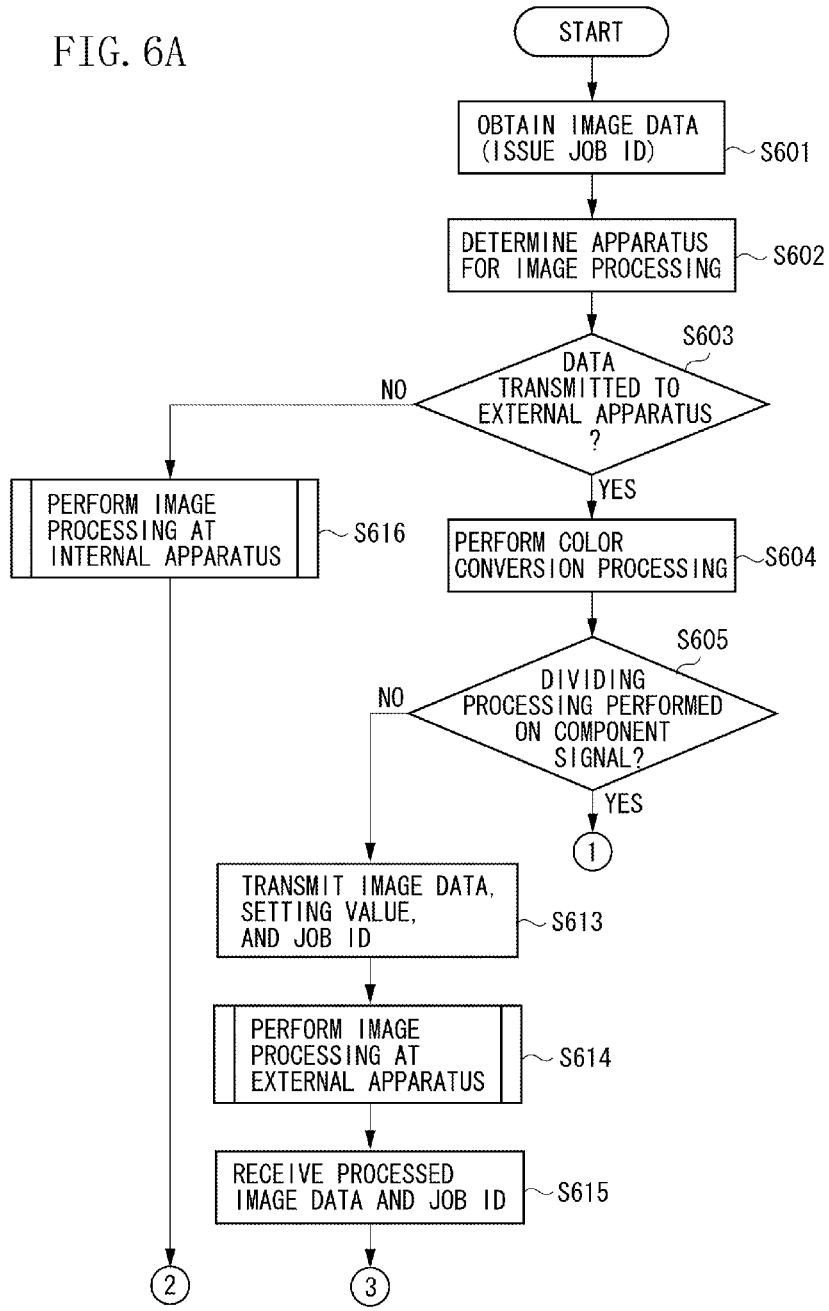

IMAGE PROCESSING APPARATUS, IMAGE PROCESSING METHOD, AND PROGRAM FOR THE SAME

BACKGROUND OF THE INVENTION

1. Field of the Invention

The present invention relates to an image processing apparatus configured to transmit image data to an external apparatus and receive the data from the external apparatus after image processing is performed on the data, an image processing method, and a program for the same.

2. Description of the Related Art

Conventionally, a system has been known in which an image processing server that is an information processing apparatus partly or entirely performs image processing on image data obtained by a terminal apparatus such as an image processing apparatus, the image data being transmitted through a network to the image processing server.

For example, Japanese Patent Application Laid-Open No. 10-276323 discusses a system in which a host computer, a facsimile, or a scanner, as an image processing request source, transmits image data to an image processing server on a network to request image processing server to perform image processing on the image data. The image processing server then returns the image data processed with the image processing to the host computer or the printer that is the request source.

In another system, an image processing server is selected, among a plurality of image processing servers on a network, according to the type of image processing to be performed, and image data is transmitted to the selected image processing server to be subjected to the image processing. In a further another system, image data is transmitted from a mobile phone equipped with a camera function to an image processing server which provides image processing service on the image data.

In recent years, the system where specific information processing is performed on input information data via a network has been widely spread as cloud computing. In the cloud computing, image processing can be performed as desired through a request from a terminal apparatus for specific image processing to an image processing server, even if the terminal apparatus does not have a function to perform the image processing. The system enables reduction in cost of the terminal apparatus, while establishing an environment providing an additional value of high functionality.

Meanwhile, the above-described system where image data is transmitted to an image processing server via a network to receive image processing there involves issues of a period of time and a load onto the network required for the transmission of the image data.

In the case where image data is to be printed, the data size is generally large. For example, the image data obtained by scanning an A4-size document at 600 dpi has a data size of about 90 Mb. Accordingly, transmission of image data from a terminal apparatus to an image processing server takes a certain period of time even if a high-speed network is used. In addition, when image data is transmitted from a plurality of terminal apparatuses to image processing servers, a larger load is applied to the network, substantially leading to a lower transmission speed and a longer period of time required for the image data transmission.

To address the issue of image data size, conventionally, target image data is compressed and its resolution is lowered before transmission. The compression of an image, however, is known to be based on the trade-off between the quality and the data size of the image. Thus, reduction of the image data size is almost certainly accompanied by deterioration of image quality after compression.

Advanced techniques can be used for the compression, but to prevent increase in the period of time for compression, a terminal apparatus as a request source of the compression is also required to have a special hardware module corresponding to the compression techniques. The special hardware module imposes a large increase in cost of the terminal apparatus that is set to request an image processing server to perform specific image processing.

Japanese Patent Application Laid-Open No. 10-276323 discusses transmission of image data by dividing the data into areas, but does not refer to the size of the image data.

SUMMARY OF THE INVENTION

The present invention relates to an image processing system that enables image processing on image data at an external apparatus after reduction in size of the image data for transmission while preventing degradation of resulting image quality.

According to an aspect of the present invention, an image processing apparatus includes a transmission unit configured to store a plurality of component signals of each pixel included in image data and to transmit a first component signal among the plurality of component signals to an external apparatus via a network, a receiving unit configured to receive a signal obtained by performing image processing on the first component signal in the external apparatus, and a synthesizing unit configured to synthesize the first component signal processed with the image processing and received by the receiving unit with a second component signal among the plurality of component signals for each pixel, wherein the second component signal is different from the first component signal.

According to the present invention, image data can be transmitted from an image processing apparatus to an external apparatus in a reduced image data size, while degradation of resulting image quality due to the transmission can be prevented.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

In a first exemplary embodiment of the present invention, a case is described where an information processing apparatus is applied to a multifunction printer (MFP). The present invention is not limited to the case, and is applicable to other information processing apparatuses without departing from the scope of the present invention.

Figure 1:
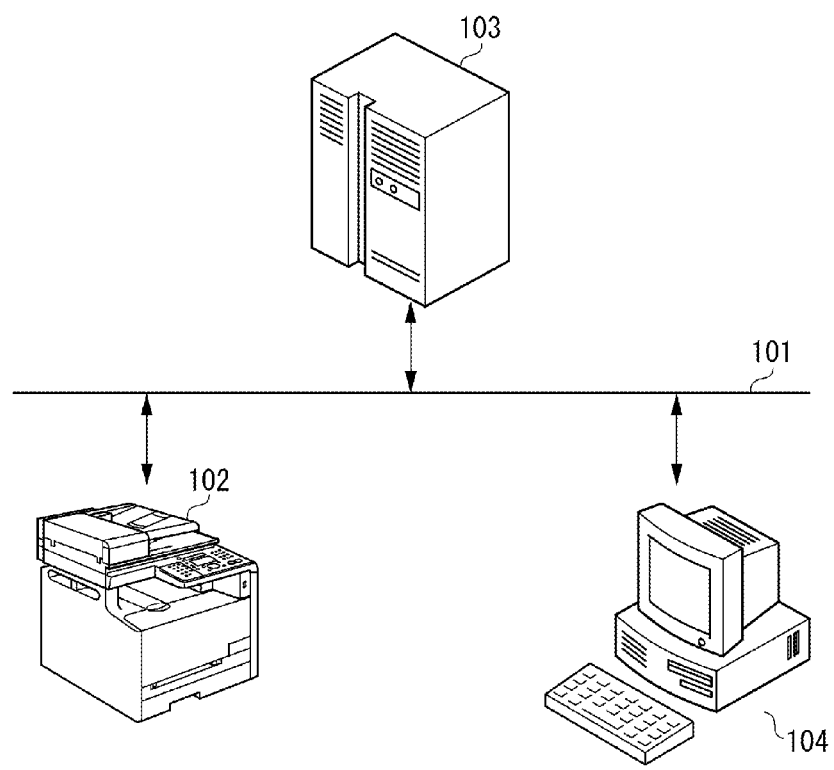
FIG. 1 is a block diagram illustrating a configuration of an image processing system according to a first exemplary embodiment of the present invention.

FIG. 1 is a block diagram illustrating a configuration of an image processing system according to the first exemplary embodiment of the present invention.

As illustrated in FIG. 1, the image processing system according to the present exemplary embodiment includes a network 101, and an MFP 102, an image processing server 103, and a host computer 104, which are respectively connected to the network 101. The image processing server 103 may be a cloud including a plurality of image processing servers.

Figure 2:
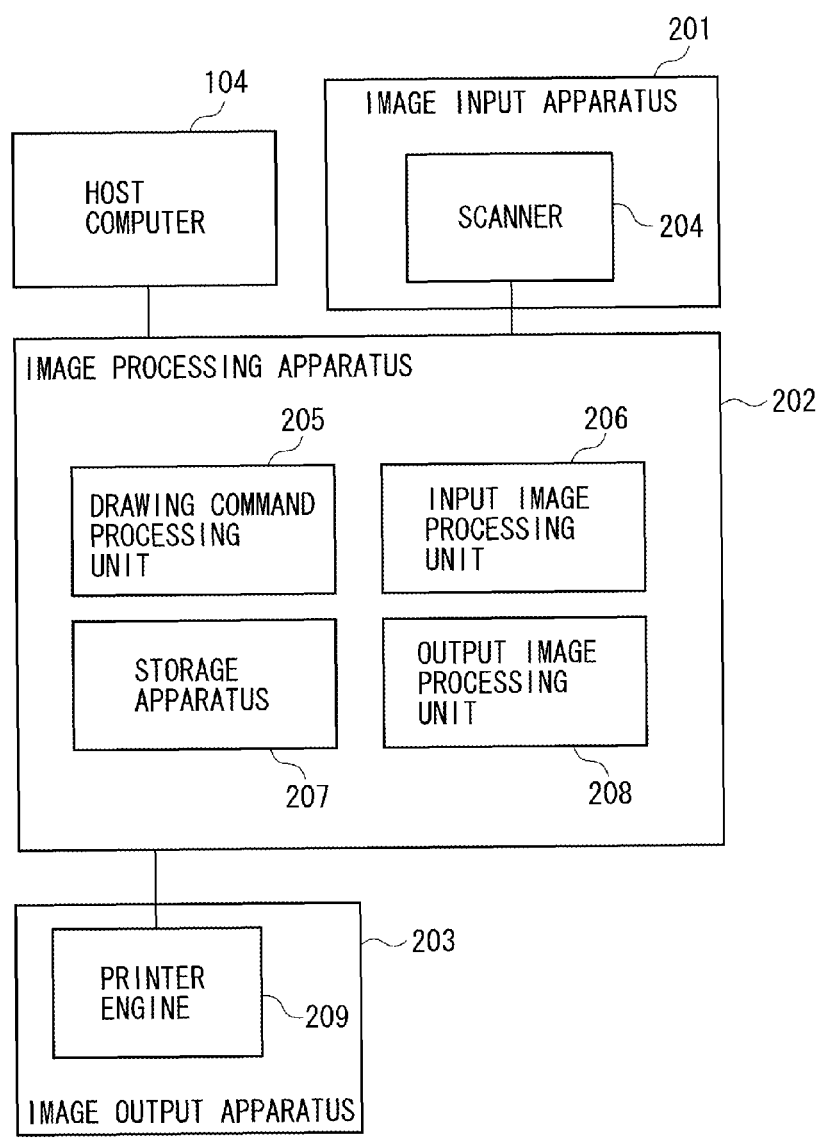
FIG. 2 is a block diagram illustrating a function configuration of a multifunction printer (MFP) according to the first exemplary embodiment.

FIG. 2 is a block diagram illustrating a function configuration of the MFP 102 according to the present exemplary embodiment. The MFP 102 includes an image input apparatus 201, an image processing apparatus 202, and an image output apparatus 203.

With reference to FIG. 2, printing processing of a bitmap image input from the image input apparatus 201 such as a scanner 204 is described.

The scanner 204 is connected to the image processing apparatus 202, and reads a bitmap image by optically scanning the image printed on paper or a film, measuring the intensity of light beams reflected from or transmitted through the image, and performing analog-to-digital conversion on the intensity. The obtained bitmap image is generally an image in a red, green, and blue (RGB) color space (i.e., an RGB image).

The bitmap image obtained by the scanner 204 is transmitted to the image processing apparatus 202. The image processing apparatus 202 includes a drawing command processing unit 205, an input image processing unit 206, a storage apparatus 207, and an output image processing unit 208.

The image output apparatus 203 is connected to the image processing apparatus 202, and includes a printer engine 209. The printer engine 209 receives image data formed in a predetermined image format from the image processing apparatus 202, and prints the image data onto paper. Generally, in order to enable a printer engine to produce a stable halftone image, image data is required to be output in a lower gradation with 2, 4, or 16 gradation levels, for example. Further, generally, image data input to the printer engine corresponds to recording materials in four colors of cyan (C), magenta (M), yellow (Y), and black (K). As a result, the image data input to the printer engine has a format for an image in a CMYK color space (i.e., CMYK image) in a lower gradation with about 2 to 16 gradation levels.

The format of the bitmap image transmitted from the scanner 204 is converted by the input image processing unit 206 and the output image processing unit 208 into another one that can be input to the printer engine 209. In other words, the input image processing unit 206 and the output image processing unit 208 perform color conversion processing on the bitmap image, using a look-up table for example, to convert the RGB image into a CMYK image. When the bitmap image is a multi-gradational image, the output image processing unit 208 performs pseudo-halftone processing on the image to convert it to an image with further low gradation by the dither method or the like.

In the above described generation processing of image data, for improvement in quality of an image to be output or depending on the purpose of the output image, the input image processing unit 206 and the output image processing unit 208 perform specific image processing on the input image data. In addition, according to the present exemplary embodiment, the image data is transmitted as needed to the image processing server 103 that is an external apparatus, to be subjected to image processing there. The image processing performed by the image processing server 103 is described in detail below.

The generated image data is transferred to the printer engine 209, so that an image is output to paper. Through the above described processing, printing processing of the image data input from the image input apparatus 201 such as the scanner 204 is completed.

Processing to receive a drawing command transmitted from the host computer 104 to print image data is described. Applications running on the host computer 104 are used to create a page layout document, a word processor document, or a graphic document. A digital document data created by the applications is transmitted to a print driver (not illustrated), where a drawing command is generated based on the digital document.

The digital document to be transmitted to the print driver is not limited to the one created by the host computer 104, but may be those created by an application of another computer or a scanner and stored in the host computer 104. The generated drawing command is generally in a page description language (PDL) that is used to create page image data. The drawing command usually includes a command to draw data such as images, graphics, and texts. The drawing command also includes a setting command for the image processing to be performed.

The generated drawing command is transmitted to the image processing apparatus 202 via the network 101.

The drawing command processing unit 205 analyzes the drawing command transmitted from the host computer 104, generates a drawing object, and performs rasterization on the drawing object to generates a bitmap image. Then, the generated bitmap image is converted by the output image processing unit 208 to an image in a format acceptable by the printer engine, that is, converted to a CMYK image in a lower gradation.

Meanwhile, in a generation process of image data input from the host computer 104 also, for improvement in quality of an image to be output or depending on the purpose of the output image, the input image processing unit 206 and the output image processing unit 208 perform specific image processing on the input image data. In addition, according to the present exemplary embodiment, the image data is transmitted as needed to the image processing server 103 that is an external apparatus, to be subjected to image processing there.

The image processing performed in the image processing server 103 is described in detail below.

The image data generated as described above is transmitted to the image output apparatus 203. The image output apparatus 203 outputs the received image data onto paper using the printer engine 209. Through the above described processing, printing processing of an image based on the drawing command from the host computer 104 is completed.

Figure 3:
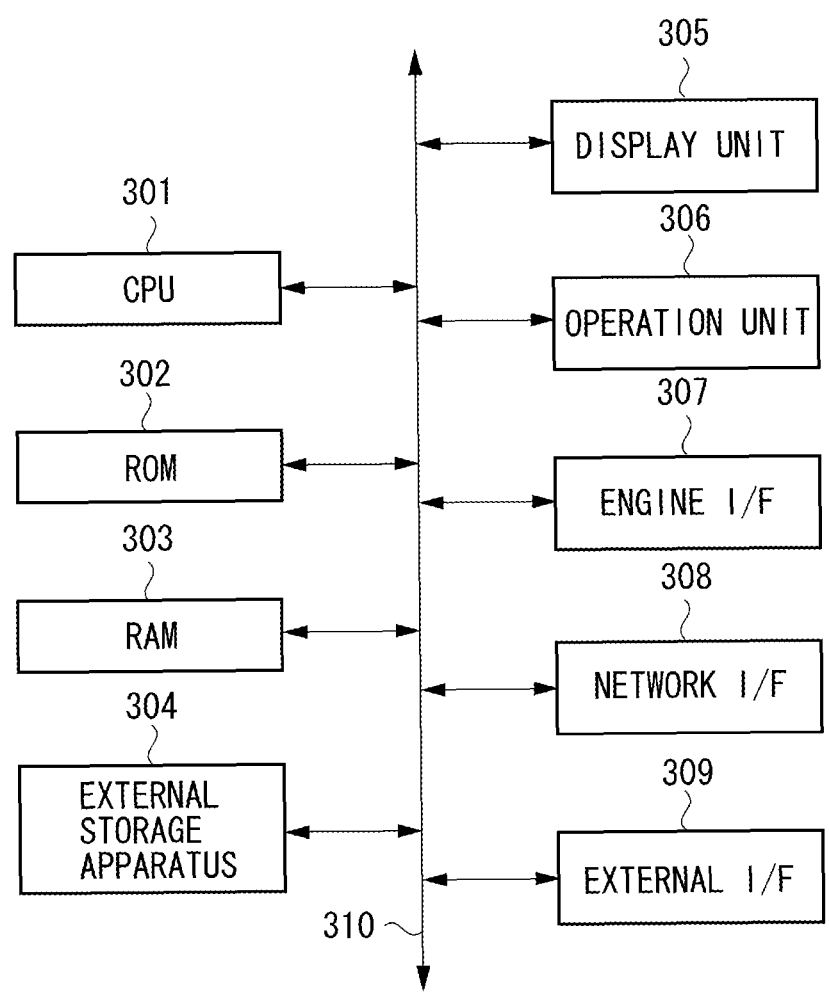
FIG. 3 is a system block diagram illustrating a configuration of an image processing apparatus according to the first exemplary embodiment.

FIG. 3 is a system block diagram illustrating a basic configuration of the image processing apparatus 202 according to the present exemplary embodiment. The image processing apparatus 202 includes a central processing unit (CPU) 301, a read only memory (ROM) 302, a random access memory (RAM) 303, an external storage apparatus 304, a display unit 305, an operation unit 306, an engine interface (I/F) 307, a network interface 308, an external interface 309, and a system bus 310.

The configuration is described in detail. The CPU 301 is a central processing unit configured to control the entire apparatus and perform calculation processing, and performs each of processing according to programs stored in the ROM 302. The processing is described below.

The ROM 302 is a memory used only for reading. The ROM 302 is a storage area for storing a system activation program, programs for controlling the printer engine, character data, and data such as character code information. The RAM 303 is a random access memory.

The RAM 303 stores font data that is additionally registered by download, and is loaded with programs and data through various processing. On the RAM 303, various programs are developed and run. The RAM 303 can be used as data storage area for received image data.

The external storage apparatus 304 includes a hard disk for example. The external storage apparatus 304 spools data, stores programs, various information files, and image data therein, and can be used as a working area. The display unit 305 displays information using crystal liquid for example.

The display unit 305 is used to display a setting status of the apparatus, a process currently performed in the apparatus, an error status, and the like. The operation unit 306 is used to change and reset the settings. The operation unit 306 also can display, in corporation with the display unit 305, an operation screen for selection of setting for image processing as described below.

The engine interface 307 is an interface through which a command to actually control the printer engine 209 or the like is input and output. The network interface 308 is used to connect the image processing apparatus 202 to the network. The image processing apparatus 202 transmits and receive image data to and from the image processing server 103 and the host computer 104 via the network 101 and the network interface 308.

The external interface 309 is connected to the scanner 204 that is an image input apparatus, via a parallel or serial interface. The system bus 310 serves as a path between these components.

A processing procedure described below with reference to a flowchart is stored in the ROM 302, the RAM 303, or the external storage apparatus 304, and is implemented by the CPU 301.

The image processing performed by the MFP 102 and the image processing server 103 is described in detail below.

According to the present exemplary embodiment, when specific image processing is performed on image data, the image processing function that is not equipped in the MFP 102 is achieved by using the image processing server 103.

The use of the image processing server 103 involves transmission of image data. According to the present exemplary embodiment, the issue of the image data size to be transmitted is solved by performing color conversion processing on the data according to the type of the image processing, and transmitting only color signals of the data required for the processing to the image processing server 103.

Figure 4:
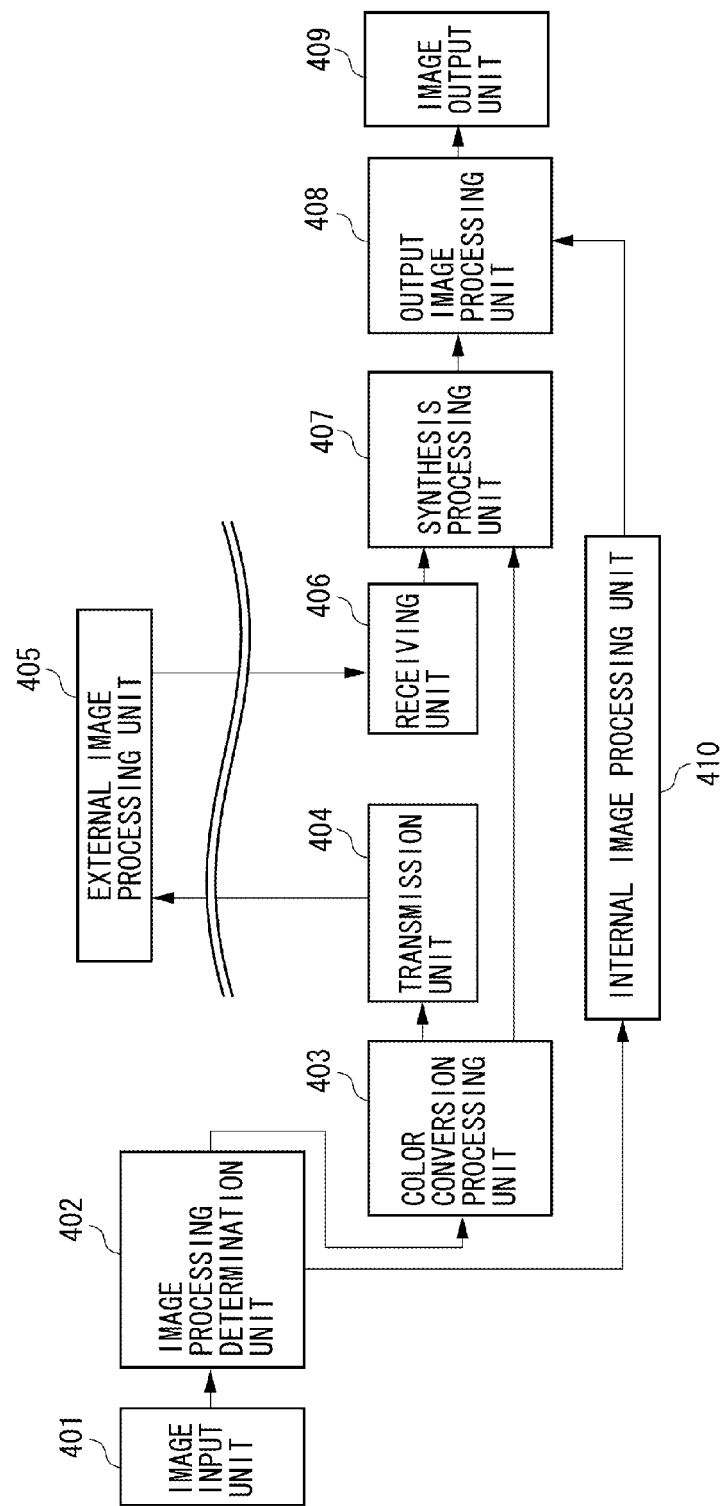
FIG. 4 is a block diagram schematically illustrating image processing according to the first exemplary embodiment.

FIG. 4 is a block diagram schematically illustrating image processing according to the present exemplary embodiment.

The function units illustrated in FIG. 4 except an external image processing unit 405 are included in the image processing apparatus 202. An image input unit 401 is a unit to which the scanner 204 and the drawing command processing unit 205 input image data. An example is described below, where the image processing server 103 performs hue and color saturation adjustment processing on obtained image data.

An image processing determination unit 402 makes determination on setting of image processing via the operation unit 306, and image processing applied to the image data obtained according to designation by a drawing command from the host computer 104. In other words, the image processing determination unit 402 determines whether the image processing is performed in the MFP 102 or in the image processing server 103 that is an external apparatus. The determination processing is described below in detail.

The image processing described below as an example is hue and color saturation adjustment processing, which is to be performed in the image processing server 103 that is an external apparatus. The hue and color saturation adjustment processing is performed to adjust hue and color saturation of an image, and a* and b* signals in a CIELab color space are used as necessary component signals of the adjustment.

A color conversion processing unit 403 converts obtained RGB image data into image data in the CIELab color space. The conversion of the color space by the color conversion processing unit 403 can be performed at a high speed in a hardware. The techniques of the color conversion processing have been known, and are not described in detail here. The conversion can be readily performed using matrix transformation or one dimensional look up table (LUT).

A transmission unit 404 transmits the component signals required for the image processing performed in the image processing server 103 among the image data pieces after color conversion by the color conversion processing unit 403, and setting parameters for the component signals via the network 101 to the image processing server 103 (i.e., an external apparatus). The image data after color conversion has a signal value for each pixel therein, and the component signal of each pixel is transmitted to the image processing server 103.

The hue and color saturation adjustment needs to use components for a* and b* chromaticity components among the component signals in the CIELab color space. Accordingly, the component signals a* and b* and adjustment parameters for adjusting hue and color saturation are transmitted to the image processing server 103. An L* signal as a lightness component is not transmitted but stored in the MFP 102.

An external image processing unit 405 performs image processing on each pixel in the image processing server 103 that is an external apparatus. According to the present exemplary embodiment, the external image processing unit 405 performs hue and color saturation adjustment processing. The hue and color saturation adjustment can be expressed in the following equations, wherein [ai, bi] are the input color signals [a*, b*], and [ao, bo] are the output color signals [a*, b*], respectively.

Hue Adjustment         Equation 1

$$\begin{pmatrix} a_o \\ b_o \end{pmatrix} = \begin{pmatrix} \cos\theta & -\sin\theta \\ \sin\theta & \cos\theta \end{pmatrix} \begin{pmatrix} a_i \\ b_i \end{pmatrix}$$

Color Saturation Adjustment $$\begin{pmatrix} a_o \\ b_o \end{pmatrix} = s \begin{pmatrix} a_i \\ b_i \end{pmatrix}$$

In the equation, "q" is hue adjustment value, and "s" is a color saturation adjustment value. The hue adjustment value "q" and the color saturation adjustment value "s" are transmitted to the image processing server 103 as adjustment parameters.

Figure 5A:
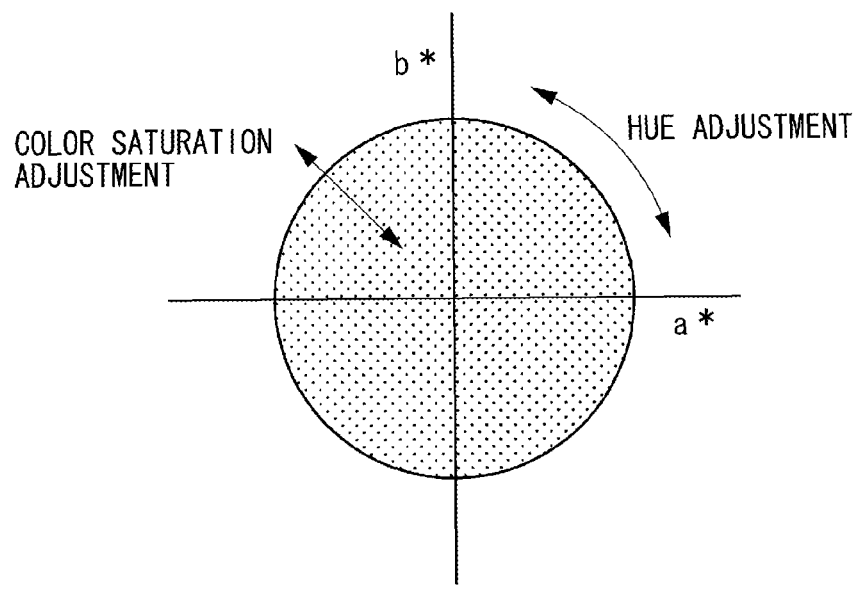
FIGS. 5A to 5C schematically illustrate image processing performed at an external apparatus according to the first exemplary embodiment.

FIG. 5A is a schematic diagram illustrating the hue and color saturation adjustment processing with the horizontal axis representing the component signal a* and the vertical axis representing the component signal b*. As illustrated in FIG. 5A, the hue and color saturation adjustment processing can be performed using only the component signals a* and b*.

The image processing server 103 transmits the component signals processed as described above to the MFP 102. A receiving unit 406 receives the component signals processed by the image processing server 103. A synthesis processing unit 407 synthesizes the received component signals with the component signals stored in the MFP 102. According to the present exemplary embodiment, the component signals a* and b* processed by the image processing server 103 are synthesized with the component signal L* stored in the MFP 102. The synthesis is performed for each of the pixels in the image data, at a position corresponding to the relevant pixel using positional information of the pixel of the processed component signals a* and b* in the image data and positional information of the stored component signal L* in the image data. The synthesized image data is converted in the color space from CIELab to RGB. The conversion in the synthesis processing unit 407 can be performed at a high speed in a hardware.

An output image processing unit 408 converts the format of the image data into the one acceptable by the printer engine 209. The output image processing unit 408 performs image processing for printer. The generated image data is transferred to the image output unit 409, where an image is output onto paper.

In the case where the image processing determination unit 402 determines that image processing to be applied is performed not in the image processing server 103 but in the MFP 102, an internal image processing unit 410 in the MFP 102 performs the image processing.

According to the present exemplary embodiment, the signals for two components a* and b* in the CIELab color space are transmitted to the server 103. This results in reduction in transmitted image data size to ⅔ as compared to that in the case where the signals for three components L*, a*, and b* in the CIELab color space are transmitted to the server 103. According to the present exemplary embodiment, no conventional image compression technique is required to transmit image data to the server 103, so that no degradation in image quality occurs, and the image data size to be transmitted can be reduced.

Table 1 lists examples of image processing performable in the image processing server 103 that is an external apparatus, according to the exemplary embodiment of the present invention.

TABLE 1

| Image Processing | Color Space Used | Transmitted Signals | Transmitted Parameters |
|---|---|---|---|
| Hue and Color Saturation Adjustment | CIELab | a* and b* | Hue Value and Color Saturation Value |
| TWO-color Printing | CIELab | a* and b* | Specific Color |
| Color Universal Design | CIELab | a* and b* | — |
| Sharpness | CIELab | L* | Sharpness Level |

In Table 1, the two-color printing processing is performed to print images in two colors of a specified color and black. When the two-color printing processing is performed on the image data obtained from the scanner 204, a two-color copy is generated. When the two-color printing processing is performed on a PDL image data obtained from the host computer 104, a two-color printing is generated.

According to the present exemplary embodiment, the two-color printing requires the component signals a* and b* in the CIELab color space. Hence, after the conversion of the RGB image to an image in the CIELab color space, the component signals a* and b* are transmitted to the image processing server 103, where the image processing is performed. The transmission includes designated data of a specific color storing color information as a setting parameter.

Figure 5B:
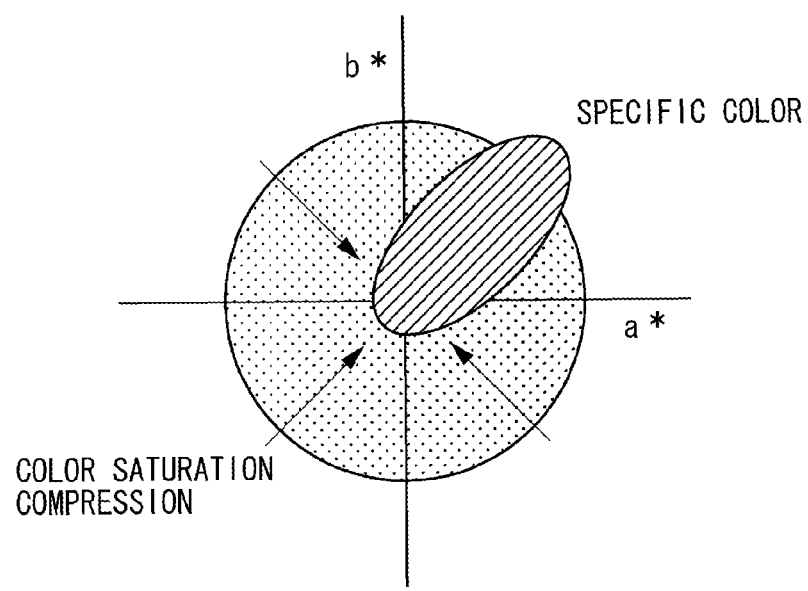

The component signals a* and b* transmitted to the image processing server 103 are subjected to color saturation compression processing, as illustrated in FIG. 5B, for the hue except the designated specific color. The component signals after the color saturation compression are returned to the MFP 102 that originally transmitted the signals, so that two-color printing processing can be performed.

The color universal design processing in Table 1 is performed to convert data into one that has colors easy to see for people with color vision defects. When the color universal design processing is applied to the image data obtained from the scanner 204, even if an original color image is composed of colors difficult to distinguish, the image can be copied to paper as an image in colors easy to distinguish.

According to the present exemplary embodiment, the color universal design processing requires the component signals a* and b* in the CIELab color space. Hence, after the conversion of the RGB image to an image in the CIELab color space, the component signals a* and b* are transmitted to the image processing server 103, where the image processing is performed.

Figure 5C:
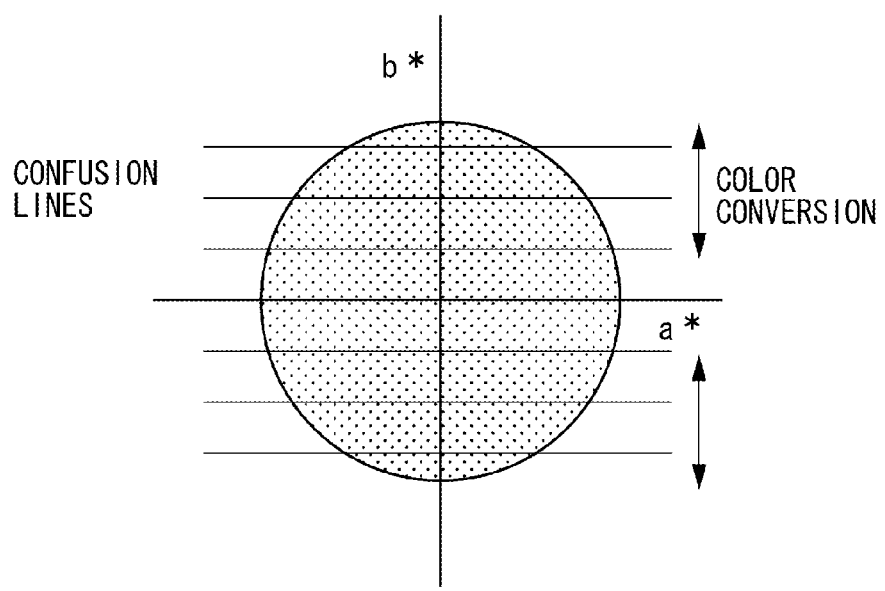

The colors difficult to distinguish for people with color vision defects are called confusion lines. FIG. 5C illustrates the confusion lines on an a*-b* plane.

Target image data is analyzed using the component signals a* and b* transmitted to the image processing server 103, so that an undistinguishable area in the target image data is identified. With respect to the component signals in the identified area, the colors difficult to distinguish can be converted to those easy to distinguish by converting the colors in the direction of the normal line of the confusion lines.

Table 1 also includes sharpness as an example of processing. The sharpness processing is often performed in the MFP 102, but requires a larger filter when performed on a frequency domain on a lower frequency side. The larger filter needs a larger memory, resulting in increase of cost of the terminal apparatus. Thus, according to the frequency area of data to which the sharpness processing is applied, determination is made on whether the processing is performed as an internal one or as an external one to switch the apparatus where the processing is performed.

According to the present exemplary embodiment, the sharpness processing requires the component signal L* in the CIELab color space. Hence, after the conversion of the RGB image to an image in the CIELab color space, the component signal L*, i.e., the lightness signal, is transmitted to the image processing server 103, where the image processing is performed. The transmission includes a parameter for sharpness level as a setting parameter. The component signals a* and b*, i.e., the color components, in the CIELab color space are stored in the MFP 102.

The component signal L* transmitted to the image processing server 103 is subjected to filtering processing according to the sharpness level setting. The component signal L* after the filtering processing is returned to the MFP 102 that originally transmitted the signal, so that the component signal L* is synthesized with the component signals a* and b* stored in the apparatus, to execute the sharpness processing.

According to the present exemplary embodiment, the component signal to be transmitted to the image server 103 is determined based on the type of image processing. As a result, only the component signal required for the image processing is transmitted to the image server 103, preventing transmission of component signals unnecessary to the image processing to the image server 103.

Table 1 includes CIELab as an example of a color space where image processing is performed, however, the color space is not limited to the CIELab. An arbitrary color space such as a CIELUV color space and a YCbCr color space can be used according to the image processing to be performed. In the case where image processing is performed on only the green (G) component in an RGB image, only the G component signal may be transmitted to the external apparatus 103 without color conversion processing on image data in the RGB color space.

Figure 6B:
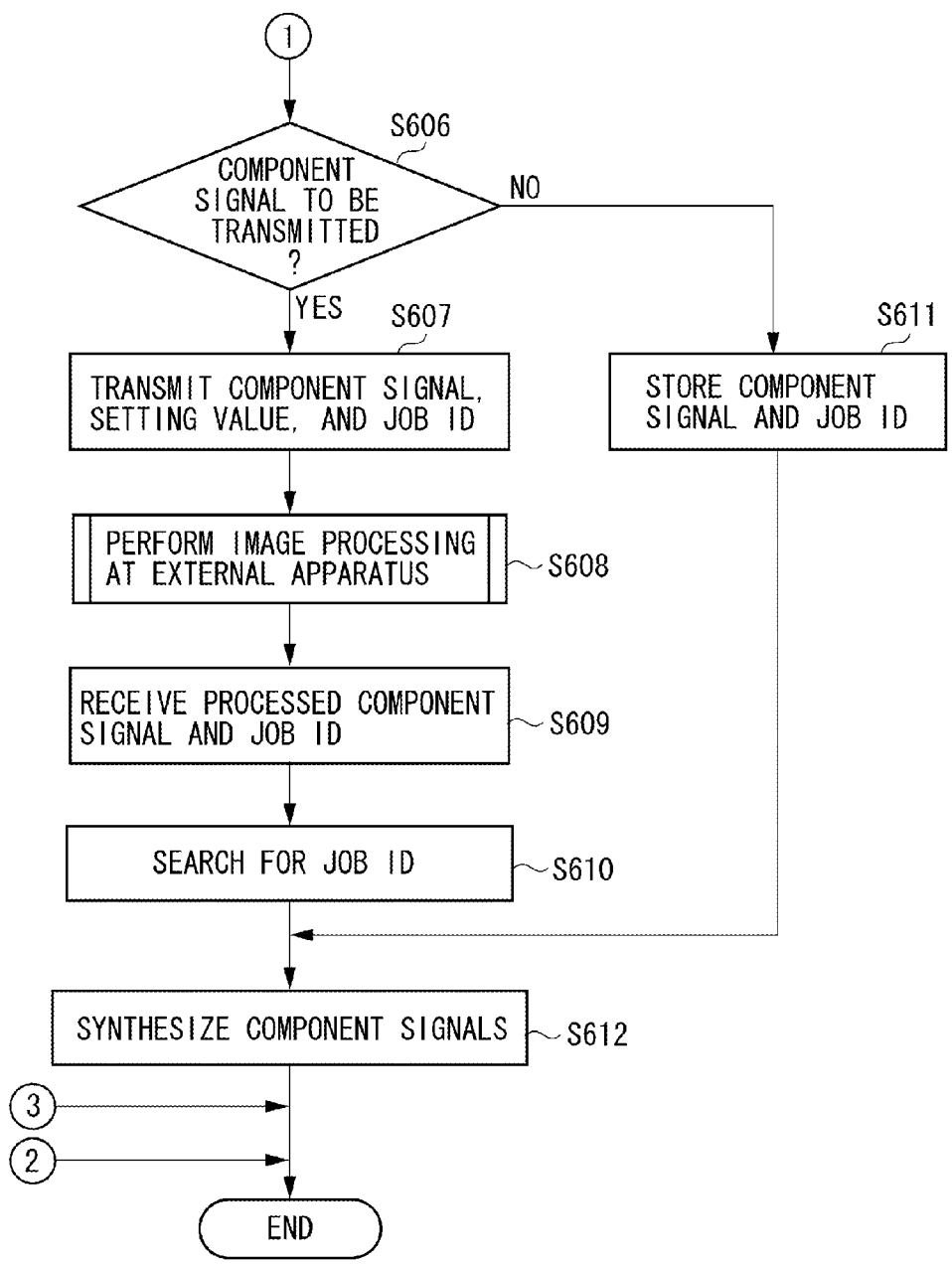
FIG. 6 (including FIGS. 6A and 6B) is a flowchart illustrating image processing performed according to the first exemplary embodiment.

FIG. 6 (including FIGS. 6A and 6B) illustrates a flowchart for performing image processing according to the present exemplary embodiment.

The image processing illustrated in FIG. 6 is performed in the image processing apparatus 202 by the CPU 301, except the external image processing. When the processing in the flowchart in FIG. 6 is implemented, first, a program for executing every processing in the flowchart in FIG. 6 is loaded to the RAM 303, the program being stored in the ROM 302 or the external storage apparatus 304. Execution of the loaded program by the CPU 301 starts the processing in the flowchart in FIG. 6.

In step S601, the CPU 301 obtains image data. At the same time, the CPU 301 issues a JOB ID of the processing to perform output to the image data.

In step S602, the CPU 301 determines the image processing to be applied to the image data obtained in step S601, and also determines whether the image processing is to be performed in the external apparatus 103 or to be performed inside of the MFP 102 (i.e., by the image processing apparatus 202).

When the CPU 301 determines in step S602 that the image processing is to be performed in the external apparatus 103 (Yes in step S603), in step S604, color conversion processing required for the image processing is performed.

In step S605, the CPU 301 determines whether the image data after color conversion can be processed in the external apparatus 103 on the basis of divided component signals of the data.

When it is determined in step S605 that the image data can be processed on the basis of divided component signals (Yes in step S605), the processing proceeds to step S606. In step S606, the component signals are respectively determined whether to be transmitted to the external apparatus 103 (Yes in step S606) or to be stored in the MFP 102 (No in step S606).

In step S607, the component signal (i.e., a first component signal) to be transmitted to the external apparatus 103 is transmitted to the external apparatus 103 with setting values for the image processing and the JOB ID. In step S608, the image processing is performed in the external apparatus 103.

Whereas in step S611, the component signal (i.e., a second component signal) that is not transmitted to the external apparatus 103 is stored in the MFP 102 together with the JOB ID.

In step S609, the MFP 102 receives the component signal after the image processing performed by the external apparatus 103 with the JOB ID. In step S610, the MFP 102 associates the component signal with the JOB ID. In step S612, the MFP 102 synthesizes the component signal received from the external apparatus 103 with the component signal stored in the MFP 102.

On the other hand, when the image processing is performed in the external apparatus 103, there is a case that all of the component signals of the image data are necessary for the processing (No in step S605). In this case, in step S613, all of the image data pieces are transmitted to the external apparatus 103 although the transmitted image data has a large size.

In step S614, the image processing is performed in the external apparatus 103. In step S615, the MFP 102 receives the image data processed with the image processing.

Depending on the type of the image processing to be applied, the image processing needs to be performed in the MFP 102 (i.e., in the image processing apparatus 202) (No in step S603). In this case, in step S616, the MFP 102 performs the image processing.

When the MFP 102 determines that the image processing needs to be performed both in the MFP 102 and in the external apparatus 103, the image processing can be performed in the order of the steps thereof. In other words, after the image processing is performed in the MFP 102, the color conversion processing can be performed for the subsequent step of the image processing, so that component signals required for the processing are transmitted to the external apparatus 103.

The determination in step 603 according to the present exemplary embodiment about the transmission to the external apparatus 103 is made as follows. The image processing server 103 stores image processing ability information that indicates the ability of the image processing server 103 to perform image processing. Example of the information is indicated in Table 1. When connected to the image processing server 103, the MFP 102 recognizes the image processing functions performable in the image processing server 103 based on the image processing ability information. Depending on the obtained information, the MFP 102 determines whether to perform the target image processing in the image processing server 103.

Figure 7A:
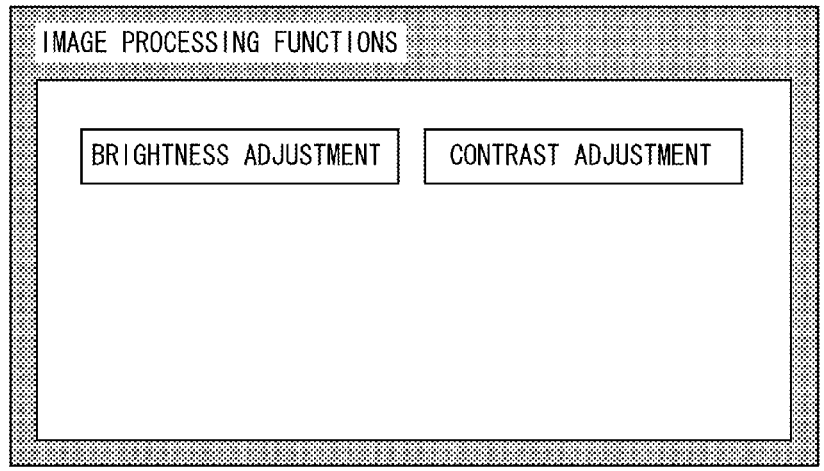
FIGS. 7A and 7B illustrate an example of image processing having extended functions according to the first exemplary embodiment.
Figure 7B:
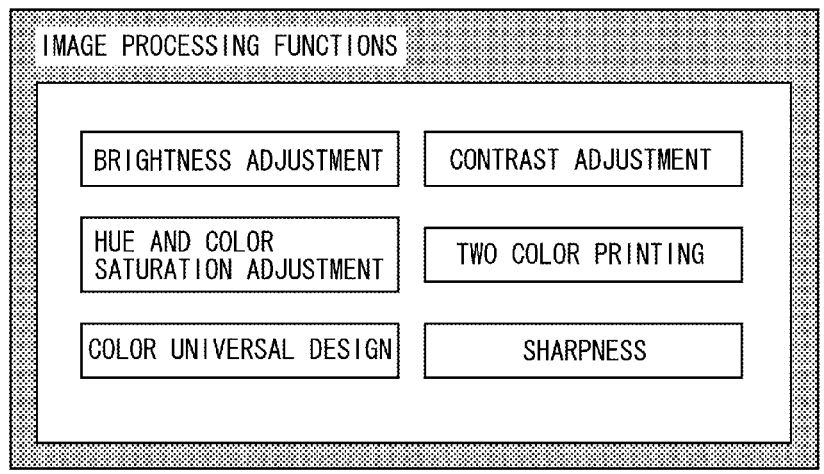

A set range of the performable image processing may be extended when the MFP 102 is connected to the image processing server 103. FIGS. 7A and 7B illustrate an example to extend a range of performable image processing when the MFP 102 is connected to the image processing server 103.

In FIG. 7A, the MFP 102 connected to the network can perform only lightness adjustment processing and contrast adjustment processing. When the MFP 102 is connected to the image processing server 103 including the image processing ability information as that illustrated in Table 1, the set range of the image processing performable in the operation unit 306 is changed from that in FIG. 7A to that in FIG. 7B. In other words, the set range in FIG. 7A corresponds to the image processing performable in the MFP 102, and an additional set range in FIG. 7B correspond to the image processing performable in the image processing server 103.

As described above, according to the present exemplary embodiment, when the MFP 102 transmits image data input thereto to the external apparatus 103 via the network so that the image data is subjected to image processing there, the MFP 102 selects and transmits component signals of the image data required for the type of the image processing to be applied to the external apparatus 103. The MFP 102 receives the component signals processed with the image processing in the external apparatus 103, and synthesizes the component signals stored in the MFP 102. This enables performance of the image processing in the external apparatus 103 while the resulting image quality is maintained and the image data size to be transmitted is reduced.

In the first exemplary embodiment, the present invention is described using a scanner as an example of an image input apparatus and a multifunction printer including a printer engine as an example of an image output apparatus.

In a second exemplary embodiment, the present invention is described using a mobile phone having an image shooting function as another example of an information processing apparatus.

Figure 8:
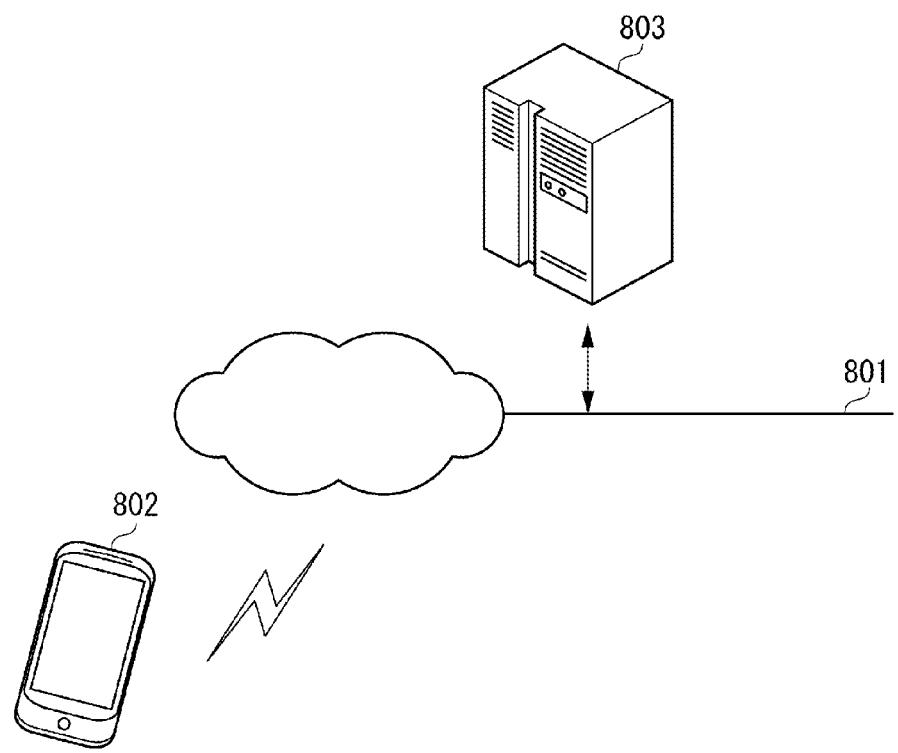
FIG. 8 is a block diagram illustrating a configuration of an image processing system according to a second exemplary embodiment of the present invention.

FIG. 8 is a block diagram illustrating a configuration of an image processing system according to the second exemplary embodiment of the present invention.

As illustrated in FIG. 8, the image processing system according to the present exemplary embodiment includes an Internet network 801, a mobile phone 802 having an image shooting function, and an image processing server 803, in which the mobile phone 802 and the server 803 are connected to the network 801.

The mobile 802 having the image shooting function includes a camera as an image input apparatus and a display as an image output apparatus.

In the second exemplary embodiment also, image processing is performed as illustrated in the flowchart in the first exemplary embodiment.

In other words, an image shot by the camera is transmitted to the image processing server 803 via the Internet network 801. Before image processing is performed, color conversion processing is performed on the image in the mobile phone 802 depending on the type of the image processing to be applied. The mobile phone 802 then selects component signals required for the image processing, and transmits them to the image processing server 803. After the image processing server 803 performs the image processing on the component signals, the mobile phone 802 receives and synthesizes the processed component signals with the component signals stored in the mobile phone 802, so that the image processing performed in the external apparatus is completed.

Aspects of the present invention can also be realized by a computer of a system or apparatus (or devices such as a CPU or a MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-234198 filed Oct. 25, 2011, which is hereby incorporated by reference herein in its entirety.

What is claimed is:

1. An image processing apparatus that is connectable to an external apparatus, comprising:
    a transmission unit configured to transmit a first component signal among a plurality of component signals of a pixel in image data to the external apparatus via a network;
    a receiving unit configured to receive a signal obtained by performing image processing on the first component signal in the external apparatus; and
    a generating unit configured to generate data for printing, using the processed first component signal received by the receiving unit and a second component signal among the plurality of component signals of the pixel,
    wherein the image processing is hue and saturation adjustment processing, the first component signal is a* and b* signals in a CIELab color space, and the second component signal is an L* signal in the CIELab color space.

2. An image processing apparatus that is connectable to an external apparatus comprising:
    a determination unit configured to determine whether an image processing is performed in the image processing apparatus or in the external apparatus;
    a transmission unit configured to transmit a first component signal among a plurality of component signals of a pixel in image data to the external apparatus via a network if the determination unit determines that the image processing is performed in the external apparatus;
    a receiving unit configured to receive a signal obtained by performing image processing on the first component signal in the external apparatus; and
    a generating unit configured to generate data for printing, using the processed first component signal received by the receiving unit and a second component signal among the plurality of component signals of the pixel.

3. The image processing apparatus according to claim 2, wherein the generating unit generates the data for printing by performing image processing for printer on image data obtained by synthesizing the processed first component signal received by the receiving unit with the second component signal among the plurality of component signals of the pixel.

4. A method for performing image processing executed by an image processing apparatus connectable to an external apparatus, the method comprising:
    transmitting a first component signal among a plurality of component signals of a pixel in image data to an external apparatus via a network;
    receiving a signal obtained by performing image processing on the first component signal in the external apparatus;
    generating data for printing using the received first component signal processed with the image processing and a second component signal among the plurality of component signals of the pixel;
    wherein the image processing is hue and saturation adjustment processing, the first component signal is a* and b* signals in a CIELab color space, and the second component signal is an L* signal in the CIELab color space.

5. A non-transitory computer-readable medium having stored thereon a program for performing a method according to claim 4.

6. An image processing apparatus that is connectable to an external apparatus, comprising:
- a transmission unit configured to transmit a first component signal among a plurality of component signals of a pixel in image data to the external apparatus via a network;
- a receiving unit configured to receive a signal obtained by performing image processing on the first component signal in the external apparatus; and
- a generating unit configured to generate data for printing, using the processed first component signal received by the receiving unit and a second component signal among the plurality of component signals of the pixel,
- wherein the image processing is sharpness processing, the first component signal is an L* signal in a CIELab color space, and the second component signal is a* and b* signals in the CIELab color space.

7. The image processing apparatus according to claim 2, wherein the first component signal is a signal indicating chromaticity, and the second component signal is a signal indicating lightness.

8. A method for performing image processing executed by an image processing apparatus connectable to an external apparatus, the method comprising:
- transmitting a first component signal among a plurality of component signals of a pixel in image data to the external apparatus via a network;
- receiving a signal obtained by performing image processing on the first component signal in the external apparatus; and
- generating data for printing, using the processed first component signal received and a second component signal among the plurality of component signals of the pixel,
- wherein the image processing is sharpness processing, the first component signal is an L* signal in a CIELab color space, and the second component signal is a* and b* signals in the CIELab color space.

9. A method for performing image processing executed by an image processing apparatus connectable to an external apparatus, the method comprising:
- determining whether an image processing is performed in the image processing apparatus or in the external apparatus;
- transmitting a first component signal among a plurality of component signals of a pixel in image data to the external apparatus via a network if determining that the image processing is performed in the external apparatus;
- receiving a signal obtained by performing image processing on the first component signal in the external apparatus; and
- generating data for printing, using the processed first component signal received and a second component signal among the plurality of component signals of the pixel.

* * * * *